United States Patent [19]

Rachels

[11] Patent Number: 5,034,911
[45] Date of Patent: Jul. 23, 1991

[54] SIGNAL PARAMETERIZER
[75] Inventor: Kenneth W. Rachels, Plano, Tex.
[73] Assignee: E-Systems, Inc., Dallas, Tex.
[21] Appl. No.: 489,711
[22] Filed: Jan. 22, 1990

Related U.S. Application Data

[63] Continuation of Ser. No. 180,060 Apr. 11, 1988, abandoned.
[51] Int. Cl.$^5$ .......................... G06F 7/34; G06F 15/35
[52] U.S. Cl. ..................................................... 364/726
[58] Field of Search ................................ 364/726, 725

[56] References Cited

U.S. PATENT DOCUMENTS 4,635,278 1/1987 Maloon et al. .......................... 375/45
4,715,000 12/1987 Premerlani .......................... 364/726

OTHER PUBLICATIONS

John D. Markel, "Z Transform Applications Using Digital Computers," Electro-Technology, Dec. 1968, pp. 21–34.
H. Nusshaumer, "Implementation of Transmultiplexers by Polynomial Transforms," IBM Technical Disclosure Bulletin, vol. 24, No. 6, Nov. 1981, pp. 3074–3080.

Primary Examiner—Dale M. Shaw
Assistant Examiner—Long T. Nguyen
Attorney, Agent, or Firm—Harold E. Meier

[57] ABSTRACT

A method and apparatus for parameterizing an input signal as a sum of N unrelated sine waves of various amplitudes, frequencies and phases using a 2N-order difference equation to describe the sine wave sum and converting the problem to a solution of the roots of an N-order polynomial.

6 Claims, 3 Drawing Sheets

SIGNAL PARAMETERIZER

This application is a continuation of Ser. No. 180,060 filed on Apr. 11, 1988 now abandoned.

TECHNICAL FIELD

The present invention relates to the field of digital communications and, in particular, to a digital communications system in which a digital input signal comprising a sum of N unrelated sine waves of various amplitudes, frequencies and phases is parameterized.

BACKGROUND OF THE INVENTION

In digital transmission systems, for a variety of reasons, the spectrum of the received wave form may differ from the spectrum of the transmitted signal. Such differences may be caused by the violation of bandwidth constraints, atmospheric transmission complications, adjacent channel interference and the like. In such cases, it is necessary, at the receiver, to perform a spectrum analysis to find the constituent frequencies which produce the composite spectrum.

The dominant mechanism currently in use to parameterize an ordinary real-world signal as an amplitude versus frequency distribution is a fourier transform in which a signal is assumed to be describeable by the formula $$y_t \sim \sum_{m=1 \ldots N}^{N} (A_m \cos\omega_m t + B_m \sin\omega_m t)$$

Hardware (and computer program) methods for determining the set of amplitude and phase coefficients $A_k$, $B_k$, incorporating a technique known as the Fast Fourier Transform (FFT) are widely used. Another widely used mechanism to parameterize the received signal as an amplitude versus frequency distribution is to construct a parallel array of filters for an analog signal, each filter responding only to a very narrow band of frequencies, and digitize the amplitudes of the outputs of the filters to yield average values for each frequency band according to the formula $$\sqrt{A_m^2 + B_m^2}.$$

In such cases, however, the actual dominant frequencies must be inferred by peak detection and interpolation.

In the Fast Fourier Transform method, a large number of samples must be processed to yield the distribution. As a consequence, it can yield results only at a much lower rate than the sampling rate. In the filter array method, a very large number of filters are required and the narrowness of the individual filter passbands causes them to be slow in responding to changes in amplitude of the frequency components that they accept.

The present invention parameterizes the received signal to yield estimates of the three parameters frequency, amplitude and phase for each frequency component assumed to be present. These estimates are yielded at the same rate as the sampling rate with a constant time delay determined only by the assumed number of frequency components (N). The amount of hardware required depends only upon N and does not depend upon the bandwidth of the input signal as the filter array method does. The precision of the required output is determined only by the precision required of the components, rather than (as is the case for the Fast Fourier Transform methods) determining the number of components required and the time delay before results are available.

The apparatus includes a storage device such as a shift register for receiving and sampling the input digital signal at a time, t, with a time interval, h, between samples. Thus, the storage device stores samples from the most recent to the oldest sample. A weighted adder receives the parallel outputs from the shift register and calculates a matrix of row and column component signals, $C_{nK}$, by adding selected ones of the stored samples using a weighting function. A matrix inverter is coupled to the weighted adder for receiving the $C_{nK}$ row and column signals and generating a set of symmetrical polynomials with each polynomial having coefficients, Z, representing the cosines of the N frequency components of the input signal. A polynomial solver is coupled to the matrix inverter for receiving the set of symmetrical polynomials and calculating the roots of each polynomial to obtain the cosine frequency components, $Z_m$, where $Z_m = \cos\omega_m h$ where m = the input frequency component between 1 and N. A function inverter is coupled to the polynomial solver for calculating the frequency, $\omega_m$, of each of the N unknown input sine waves for each of the digital samples according to the equation $\omega_m = 1/h \cos Z_m$.

Once the frequency is obtained, sine/cosine functions can be generated and, using the stored digital input samples, the respective signal amplitude coefficients and signal phase coefficients can be calculated. From these coefficients, the signal amplitude and signal phase can be determined.

SUMMARY OF THE INVENTION

Thus, the present invention relates to apparatus for parameterizing a digital input signal which is the sum of N unrelated sine waves of various frequencies, amplitudes and phases $\omega_m$, $A_m$, $B_m$ where m = 1···N comprising means for storing samples $Y_t \cdots Y_{t-(3N-1)h}$ of the digital input signal representing samples at time, t, from the most recent to the oldest sample where h = time interval between samples, means coupled to the sample storing means for receiving the stored samples and calculating a matrix of row and column input signals, $C_{nK}$, by adding selected ones of the stored samples, $Y_t$, using a weighting function according to the equation $$C_{nk} = (-2)^{-K+1} \sum_{l=0}^{K} \binom{K}{l} Y_{t-(n+2K-l-3)h}$$

where n = 1···N rows, K = 1···N+1 columns, h = time interval between samples and l = a column between 0 and K, to obtain the matrix $$\begin{bmatrix} y_t - \tfrac{1}{2}(y_{t+h} + y_{t-h}) & \tfrac{1}{4}(y_{t+2h} + 2y_t + y_{t-2h}) \cdots \\ y_{t+h} - \tfrac{1}{2}(y_{t+2h} + y_t) & \tfrac{1}{4}(y_{t+3h} + 2y_{t+h} + y_{t-h}) \cdots \\ \cdot & \cdot \\ \cdot & \cdot \\ \cdot & \cdot \\ y_{t+(N-1)h} - \tfrac{1}{2}(y_{t+Nh} + y_{t+(N-2)h}) \cdots \end{bmatrix} \begin{bmatrix} \sigma^N \\ \sigma^{N-1} \\ \cdot \\ \cdot \\ \cdot \\ \sigma^1 \end{bmatrix} =$$

-continued $$\begin{bmatrix} \frac{(-)^{N+1}}{2^N} (y_{t+Nh} + Ny_{t+(N-2)h} + \cdots \\ \vdots \\ \end{bmatrix}$$

a matrix inverter coupled to the calculating means for receiving the $C_{nK}$ row and column signals and generating a set of symmetrical polynomials $\{\sigma^m\}$ according to the equation $$\sigma^{(N+1-n)} = (-)^{n+1} \sum_{K=1}^{N} (C^{-1})_{nK} (C_{K,N+1})$$

each polynomial having coefficients, Z, representing the cosines of the N frequency components of the input signal, a polynomial solver coupled to the matrix inverter for receiving the set of symmetrical polynomials $\{\sigma^m\}$ and calculating the roots of each polynomial according to the equation $$O = \sum_{K=0}^{N} (-)^K \sigma^{(K)} N-K$$

to obtain the cosine frequency components, $Z_m$, where $Z_m = \cos\omega_m h$ and m = the input frequency component between 1 and N and a function inverter coupled to the polynomial solver for calculating the frequency, $\omega_m$, of each of the N unknown input sine waves for each of the digital samples according to the equation $$\omega_m = \frac{1}{h} \text{acos } Z_m.$$

BRIEF DESCRIPTION OF THE DRAWINGS

For a more complete understanding of the present invention and the advantages thereof, reference is now made to the following description taken in conjunction with the accompanying drawings.

Referring to the drawings.

DETAILED DESCRIPTION OF THE DRAWINGS

Figures 1, 2:
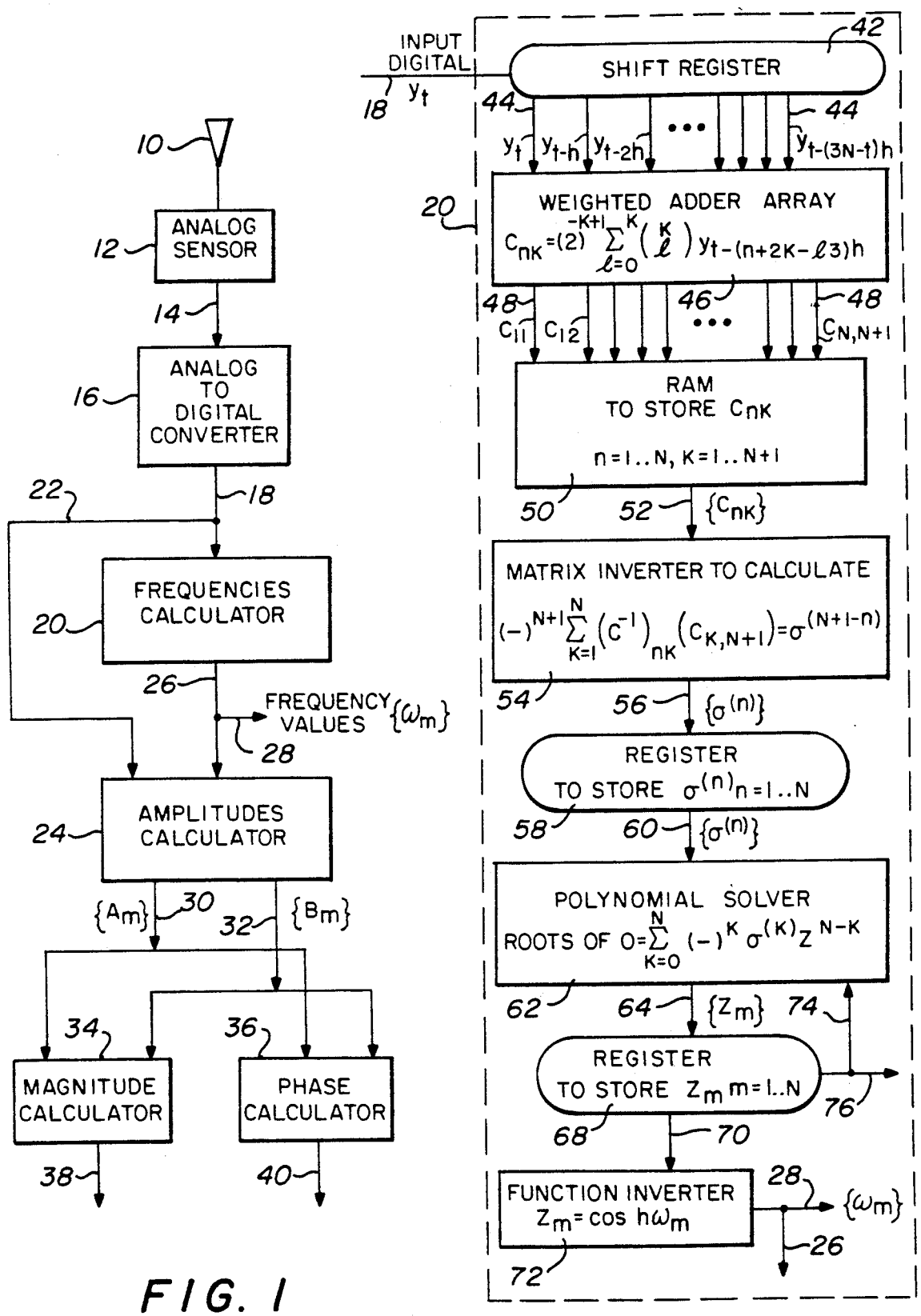
FIG. 1 is a schematic representation of the general system utilizing the present invention to parameterize an input signal to obtain the frequency, amplitude and phase of each of the N unrelated sine waves forming the input signal.
FIG. 2 is a detailed block diagram of the frequency calculator illustrated in FIG. 1 which is used in the present invention to calculate the frequencies of the unknown sine waves.

Referring now to FIG. 1, an input signal comprising a sum of N unrelated sine, waves of various frequencies, amplitudes and phases may be received in any well known manner such as, for example, antenna 10 and processed in the normal manner by providing a device such as circuit 12 to produce an analog signal on line 14. The analog-to-digital converter 16 converts the incoming analog signal on line 14 to digital signals on output line 18 and these signals are coupled to frequency calculator 20 and, on line 22, to amplitude calculator 24. The output of the frequency calculator 20 on line 26 and 28 represents the set of frequency values $\{\omega_m\}$ for the N unrelated sine waves.

The amplitude calculator 24 generates sets of amplitudes $A_m$ and sets of phases $B_m$ on lines 30 and 32 respectively. A magnitude calculator 34 receives the sets of amplitudes on line 30 and generates the individual amplitudes as outputs on line 38. In a like manner, the phase calculator 36 receives the sets of phases on line 32 and generates the individual phases of the input signal components on line 40.

Thus, the object of the circuit of FIG. 1 is to determine the parameters $\{A_m, B_m, \omega_m\}$ of the input signal under the assumption that the input can be described by the formula $$y_t \sim \sum_{m=1\ldots N}^{N} (A_m \cos\omega_m t + B_m \sin\omega_m t) \tag{1}$$

where the input is the result $(Y_t)$ of sampling an input signal source at constant time intervals, $t = t_o + k^*h$. The theory upon which the circuit of FIG. 1 makes the parameter determination is as follows:

Define the time-step operator E such that $$E^n f(t) = f(t + hn) \tag{2}$$

where n is an integer. Then $f = A\cos\omega_t + B\sin\omega_t$ obeys the difference equation
$$= E^2 - 2(\cos\omega h)E + 1 | f(t) = O \tag{3}$$

in which the amplitudes have been eliminated. Then $$f = \sum_{m=1}^{N} (A_m \cos\omega_m t + B_m \sin\omega_m t) \tag{4}$$

obeys the difference equation $$\prod_{m=1}^{N} (E^2 - 2(\cos\omega_m h)E + 1)f(t) = 0 \tag{5}$$

or $$\prod_{m=1}^{N} \left( \cos\omega_m h - \frac{1}{2}(E + E^{-1}) \right) f(t) = 0 \tag{6}$$

Denoting $Z_m = \cos\omega_m h$, equation (6) becomes $$\prod_{m=1}^{N} \left( Z_m - \frac{E + E^{-1}}{2} \right) f(t) = 0 \tag{7}$$

or, with $\sigma^l(z)$ being the totally symmetric polynomial of degree l in the Zs, $$\sigma^N(Z) - \sigma^{N-1}(Z)\left( \frac{E + E^{-1}}{2} \right) + \tag{8}$$

-continued $$\sigma^{N-2}(Z)\left(\frac{E+E^{-1}}{2}\right)^2 - \ldots + (-)^N \left(\frac{E+E^{-1}}{2}\right)^N = 0$$

For example, with N=3

$$Z_1 Z_2 Z_3 - \frac{1}{2}(Z_1 Z_2 + Z_2 Z_3 + Z_3 Z_1)(E + E^{-1}) + \frac{1}{4}(Z_1 + Z_2 + Z_3)(E^2 + 1 + E^{-1}) - \frac{1}{8}(E^2 + 3E + 3E^{-1} + E^{-2}) = 0 \quad (9)$$

or $$Z_1 Z_2 Z_3 E^2 - \frac{1}{2}(Z_1 Z_2 + Z_2 Z_3 + Z_3 Z_1)(E^4 + E^2) + \frac{1}{4}(Z_1 + Z_2 + Z_3)(E^5 + 2E^2 + E) - \frac{1}{8}(E^6 + 3E^4 + 3E^2 + 1) = 0 \quad (10)$$

When applied to the input signal, $Y_t$, equation (10) becomes $$\sigma_{(Z)}^N y_t - \sigma_{(Z)}^{N-1} \frac{1}{2}(y_{t+h} + y_{t-h}) + \sigma_{(Z)}^{N-2} \frac{1}{4}(y_{t+2h} + 2y_t + y_{t-2h}) - \ldots = 0 \quad (11)$$

This is an equation for the set of totally symmetrical polynomials $\{\sigma l\}$ of degree 1 using $2N+1$ measurements; if it is applied similarly for times, t, t+h,..., t+(N−1)h, 3N measurements are used to obtain a set of N symmetrical polynomial equations in the N unknowns $\{\sigma l\}$:

$$\begin{bmatrix} y_t & -\frac{1}{2}(y_{t+h}+y_{t-h}) & \frac{1}{4}(y_{t+2h}+2y_t+y_{t-2h}) \ldots \\ y_{t+h} & -\frac{1}{2}(y_{t+2h}+y_t) & \frac{1}{4}(y_{t+3h}+2y_{t+h}+y_{t-k}) \ldots \\ \vdots & & \\ y_{t+(N-1)h} & -\frac{1}{2}(y_{t+Nh}+y_{t+(N-2)h}) \ldots & \end{bmatrix} \begin{bmatrix} \sigma^N \\ \sigma^{N-1} \\ \vdots \\ \sigma^1 \end{bmatrix} = \begin{bmatrix} \frac{(-)^{N+1}}{2^N}(y_{t+Nh} + Ny_{t+(N-2)h} + \ldots \\ \vdots \end{bmatrix}$$

These simultaneous equations are solved for the set of symmetrical polynomials $\{\sigma l\}$ using standard methods (time $\propto N^3$). It is then possible to solve for the $Z_m$ using Newton's method or other well known methods. As can easily be verified, the sum-of-products form of $$g(x) = \prod_{m=1}^{N}(X - Z_m) \quad (13)$$

is $$g(x) = \sum_{l=0}^{N}(-)^l \sigma_{(Z)}^{N-l} X^l \quad (14)$$

or $$g(X) = X^N - \sigma_{(Z)}^1 X^{N-1} + \sigma_{(Z)}^2 X^{N-2} - \ldots + (-)^N \sigma^N \quad (15)$$

Thus, if equation (15) is solved for g(X)=0 for the N values of X, those values are the sets of cosine frequency components $\{Z_m\}$. This can be readily done using standard algorithms. Then, given the $Z_m$ values, $$\omega_m = \frac{1}{h} a\cos Z_m \quad (16)$$

After the $\omega_m$ have been determined, it is simple to calculate and solve the simultaneous equations for the $A_m$ and $B_m$ values:

$$\begin{bmatrix} y_t \\ y_{t+h} \\ \vdots \\ y_{t+(N-1)h} \\ y_{t+2Nh} \\ \vdots \\ y_{t+(3N-2)h} \\ y_{t+(2N-1)h} \end{bmatrix} = \begin{bmatrix} \cos\omega_1 t & \sin\omega_1 t & \cos\omega_2 t & \sin\omega_2 t & \ldots & \sin\omega_N t \\ \cos\omega_1(t+h) & \sin\omega_1(t+h) & \ldots & & & \\ \cos\omega_1(t+[N-1]h) & \ldots & & & & \\ \vdots & & & & & \end{bmatrix} \begin{bmatrix} A_1 \\ B_1 \\ \vdots \\ A_N \\ B_N \end{bmatrix} \quad (17)$$

After these are found, the amplitudes and phases can be found using $$ampl_m = \sqrt{A_m^2 + B_m^2} \tag{18}$$

Figure 3:
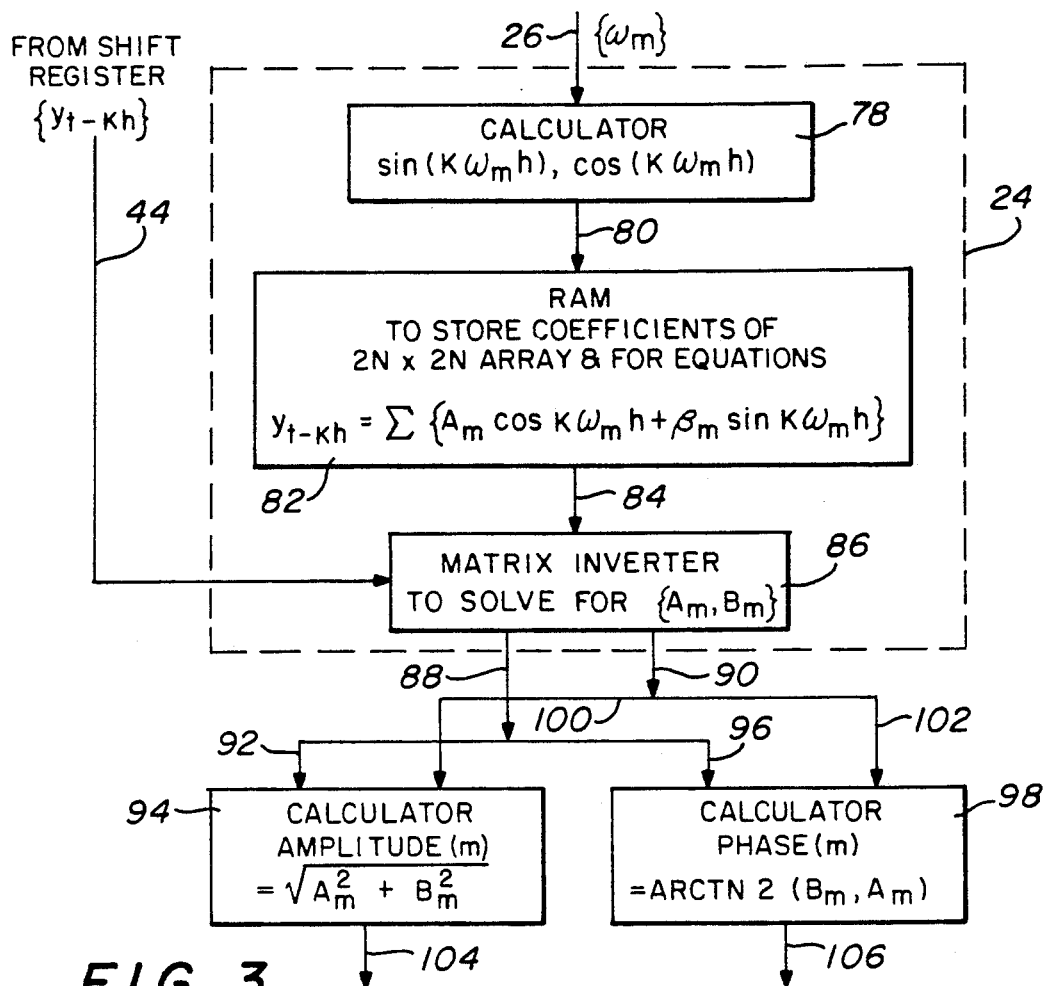
FIG. 3 is a schematic block diagram of the amplitude and phase calculator of the present invention.

The implementation of this theory is accomplished by the circuits shown in FIG. 2 and FIG. 3.

FIG. 2 is a circuit diagram of the frequency calculator 20 which receives the input digital signal on line 18 and includes a shift register 42 for storing samples $Y_t$..$Y_{t-(3N-1)h}$ of the digital input signal representing samples at time, t, from the most recent to the oldest sample where h= the time interval between samples. The shift register 42 outputs the stored signals on parallel lines 44 to a weighted adder array 46. Adder 46 receives the stored samples and calculates a matrix of row and column component signals, $C_{nK}$, by adding selected ones of the stored samples, $Y^t...Y^{t-(3N-1)h}$ with a weighting function according to the equation $$C_{nK} = (-2)^{-K+1} \sum_{l=0}^{K} \binom{K}{l} y_{t-(n+2K-l-3)h} \tag{19}$$

where $$\binom{K}{l}$$

is an expression representing the number of combinations of K things taken l at a time, n=1...N rows, K=1...N+1 columns, h= the time interval between samples and l= a column between 0 and K, to obtain the matrix $$\begin{bmatrix} y_t & -\frac{1}{2}(y_{t+h} + y_{t-h}) & \frac{1}{4}(y_{t+2h} + 2y_t + y_{t-2h}) \cdots \\ y_{t+h} & -\frac{1}{2}(y_{t+2h} + y_t) & \frac{1}{4}(y_{t+3h} + 2y_{t+k} + y_{t-k}) \cdots \\ \cdot & \cdot & \cdot \\ \cdot & \cdot & \cdot \\ y_{t+(N-1)h} & -\frac{1}{2}(y_{t+Nh} + y_{t+(N-2)h}) \cdots \end{bmatrix} \tag{12}$$

which is the set of N symmetrical polynomial equations $\{\sigma^l\}$. This matrix array of signals are output from the weighted adder array 46 on lines 48 to a RAM 50 which stores the signals $C_{nK}$. The sets of the row and column signals $C_{nK}$ are coupled from RAM 50 on line 52 to a matrix inverter 54. Matrix inverter 54 generates signals representing a set of symmetrical polynomials, $\{\sigma^m\}$, according to equation $$\sigma^{(N+1-n)} = (-)^{N+1} \sum_{K=1}^{N} (C^{-1})_{nK}(C_{K,N+1}) \tag{20}$$

with each polynomial having coefficients, Z, representing the cosines of the N frequency components of the input signal. The signals representing sets of polynomials that are calculated by the matrix inverter are coupled on line 56 to a register 58 where they are stored.

Polynomial solver 62 receives the signals representing the sets of polynomials on line 60 and calculates the roots of each polynomial according to the equation $$o = \Sigma(-)^k \sigma^{(K)} Z^{N-K} \tag{21}$$

to obtain the cosine frequency components, $Z_m$, where $Z_m = \cos\omega_m h$ and m= the input frequency component between 1 and N.

The output signals of the polynomial solver 62 on line 64 are stored in register 68. The function inverter 72 receives the signals on line 70 from register 68 and calculates the frequency, $\omega_m$ of each of the N unknown input sine waves for each of the digital samples according to the equation $$\omega_m = \frac{1}{h} a\cos Z_m \tag{22}$$

As will be explained later in conjunction with FIG. 5, the output signals of register 68 on line 74 are Z values which may be coupled back to the polynomial solver 62 to speed up the Newton's method of solution. The output of the register on line 76 may also be used for amplitude calculations instead of using the sets, $\{\omega_m\}$, as will be explained hereafter.

FIG. 3 discloses the amplitude and phase calculator $$\begin{bmatrix} \sigma^N \\ \sigma^{N-1} \\ \cdot \\ \cdot \\ \sigma^1 \end{bmatrix} = \begin{bmatrix} \frac{(-)^{N+1}}{2^N}(y_{t+Nh} + Ny_{t+(N-2)h} + \cdots \\ \cdot \end{bmatrix}$$

of the present invention.

The sets of calculated frequencies, $\{\omega_m\}$, on line 26 are coupled to a calculator 78 which calculates a $2N \times 2N$ array of coefficients $\sin(K\omega_m h)$ and $\cos(K\omega_m h)$ for use in solving the equation $$y_{t-Kh} = \sum_{m=1...N}^{N} \{A_m \cos k\omega_m h + B_m \sin k\omega_m h\} \tag{23}$$

This array of coefficients is coupled on line 80 to RAM 82 where they are stored.

The output of RAM 82 on line 84 is coupled to a second matrix inverter 86 which, in conjunction with the input signal samples on line 44 from shift register 42, solves for the sets of amplitudes and phases $\{A_m\}$ and $\{B_m\}$. Matrix inverter 86 calculates and solves the simultaneous equations for the $A_m$ and $B_m$ values according to the matrix equation $$
\begin{bmatrix} y_t \\ y_{t+h} \\ \cdot \\ \cdot \\ \cdot \\ y_{t+(N-1)h} \\ y_{t+2Nh} \\ \cdot \\ \cdot \\ \cdot \\ y_{t+(3N-2)h} \\ y_t + (3N-1)h \end{bmatrix} = \begin{bmatrix} \cos \omega_1 t \sin \omega_1 t \cos \omega_2 t \sin \omega_2 t \ldots \sin \omega_N t \\ \cos \omega_1(t+h) \sin \omega_1(t+h) \ldots \\ \cos \omega_1(t+[N-1]h) \ldots \\ \cdot \\ \cdot \\ \cdot \end{bmatrix} \begin{bmatrix} A_1 \\ B_1 \\ \cdot \\ \cdot \\ \cdot \\ A_N \\ B_N \end{bmatrix} \quad (17)
$$

The $A_m$ output from the matrix inverter 86 on line 88 is coupled on line 92 to amplitude calculator 94 and on line 96 to phase calculator 98. In a like manner, the phase output, $B_m$, on line 90 from matrix inverter 86 is coupled on line 100 to the amplitude calculator 94 and line 102 to the phase calculator 98.

Amplitude calculator 94 determines the amplitude according to equation $$\sqrt{A_m^2 + B_m^2} \quad (18)$$

which is a square root function. This could be accomplished in several ways including a ROM look-up table for the square root function.

In a like manner, the phase calculator 98 calculates the phase of each of the input sine waves according to the equation arctan $2(B_m, A_m)$ and generates the result on line 106. Again, a ROM look-up table could be utilized to determine the phase with calculator 98.

Figure 4:
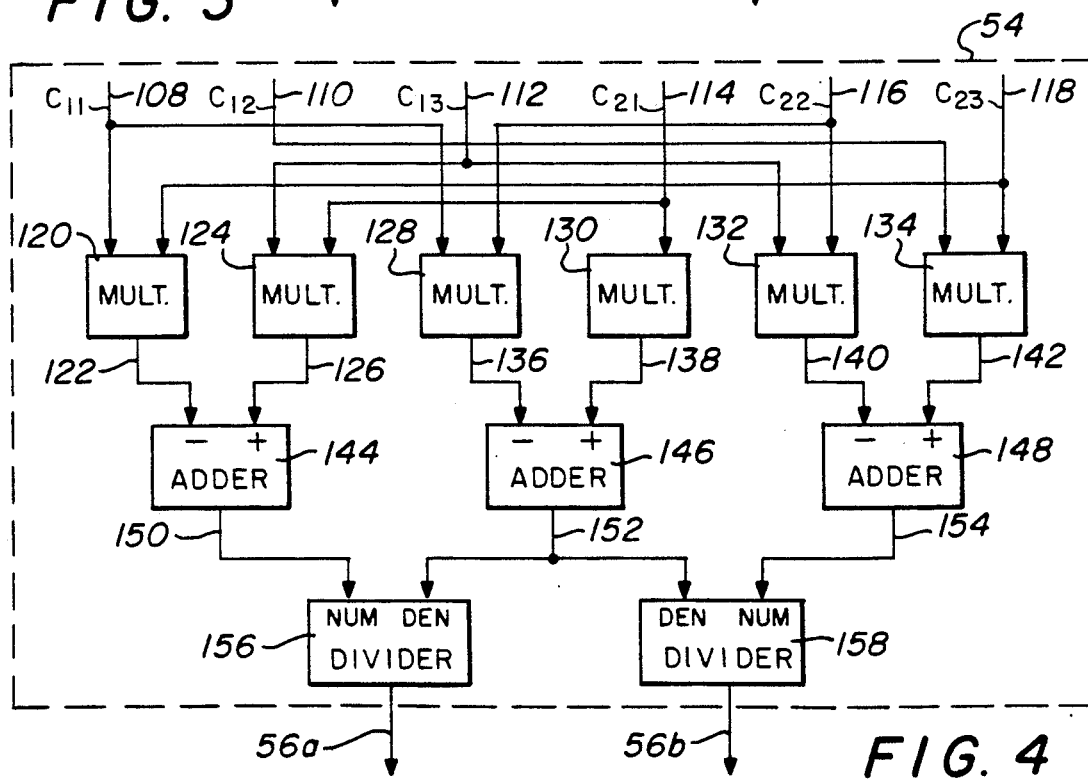
FIG. 4 is a schematic illustration of a possible implementation of the matrix inverter illustrated in both FIG. 2 and FIG. 3.

A possible implementation of the matrix inverter 54 where $N=2$ is shown in FIG. 4. This circuit multiplies, sums and then divides the appropriate terms in equation $$\sigma^{(N+1-n)} = (-)^{N+1} \sum_{K=1}^{N} (C^{-1})_{nK}(C_{K,N+1}) \quad (20)$$

Thus, signals representing a set of symmetrical polynomials are generated with each polynomial having coefficients, Z, representing the cosine of the N frequency components of the input signal.

As can be seen in FIG. 4, matrix inverter 54 receives the $C_{nK}$ row and column signals on line 52 from RAM 50 which, for the purposes of example with the circuit shown in FIG. 4, comprises the signal from row 1 and column 1 on line 108, the signal from row 1, column 2 on line 110, the signal from row 1, column 3 on line 112, the signal from row 2, column 1 on line 114, the signal from row 2, column 2 on line 116, and the signal from row 2, column 3 on line 118. The $C_{11}$ signal on line 108 and $C_{23}$ on line 118 are coupled to multiplier 120 which multiplies the two together and generates the product signal on line 122. The $C_{13}$ signal on line 112 and the $C_{21}$ signal on line 114 are coupled to multiplier 124 which produces the product signal on line 126. Multiplier 128 multiplies the $C_{11}$ signal and the $C_{22}$ signal and generates the product signal on line 136. Multiplier 130 multiplies the $C_{12}$ and $C_{21}$ signals and generates the resulting product signal on line 138 while multiplier 132 multiplies the $C_{13}$ and $C_{22}$ signals and generates the product signal on line 140. Finally, multiplier 134 multiplies signals $C_{12}$ and $C_{23}$ and generates the product signal on line 142.

Adder 144 receives the signals on line 122 and 126, algebraically sums the two and generates an output on line 150 to divider 156 as the numerator. Adder 146 algebraically sums the signals on line 136 and 138 and couples the resulting output on line 152 to divider 156 as the denominator. It also couples the same signal on line 152 to the divider 158 as the denominator. Adder 148 receives the signals on line 140 and 142, algebraically sums them and produces an output on line 154 to divider 158 as the numerator. Thus, $\sigma^1$ is generated as an output signal on line 56a while $\sigma^2$ is generated as an output signal on line 56b as a set of symmetrical polynomials where $N=2$. These output signals representing sets of polynomials are stored in register 58 in FIG. 2 which couples them to polynomial solver 62 on line 60.

Figure 5:
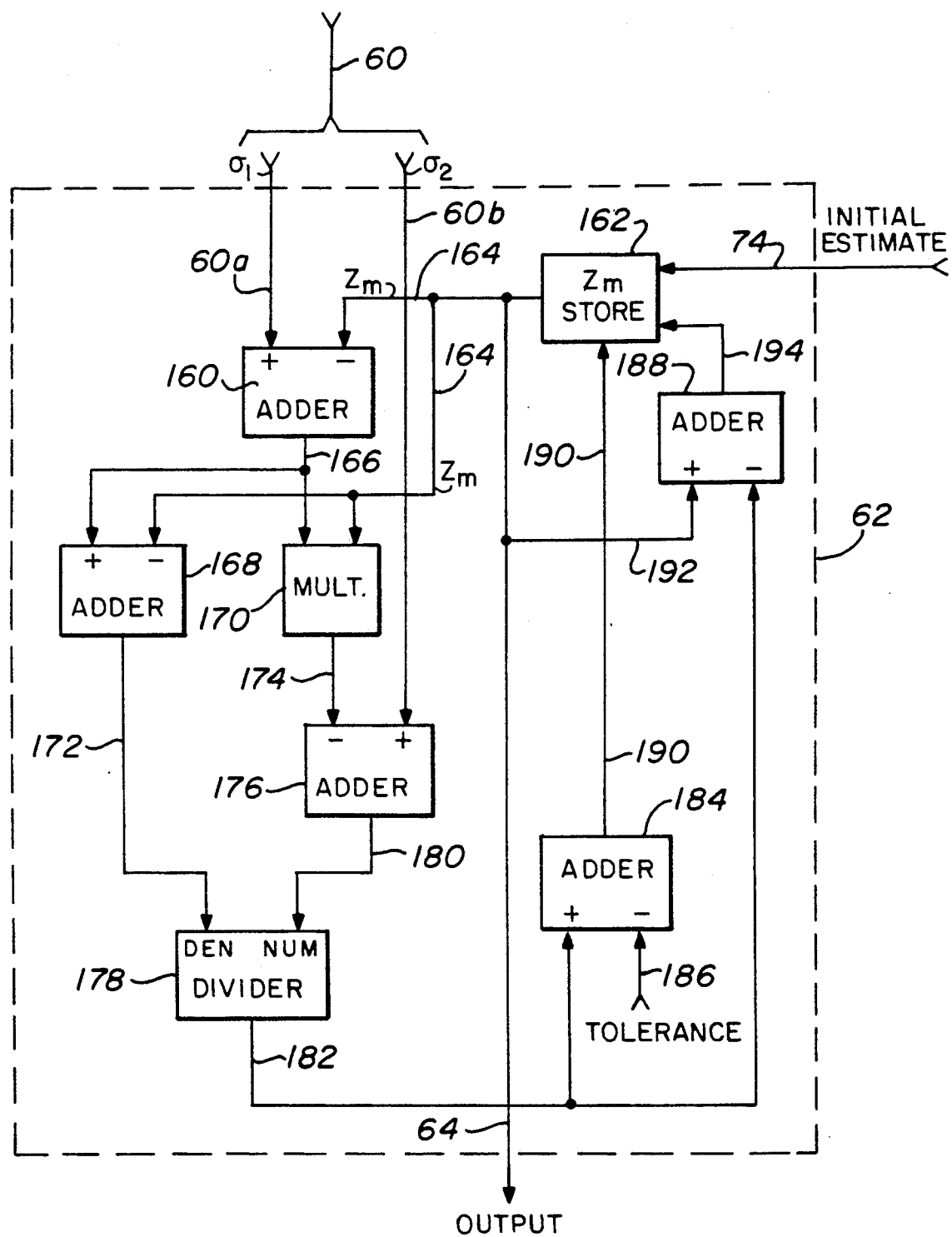
FIG. 5 is a schematic block diagram of a possible implementation of the polynomial solver illustrated in FIG. 2.

FIG. 5 illustrates the possible implementation of the polynomial solver 62 where $N=2$. In such case, the symmetrical polynomial signals on lines 60a and 60b are coupled into the polynomial solver 62. The symmetrical polynomial on line 60a is coupled as one input signal to an adder 160 with the other input signal being the previous cosine frequency component, $Z_m$, stored in unit 162 which generates the $Z_m$ output signal on line 164. The $Z_m$ output signal on line 164 from storage unit 162 is also coupled as one input to adder 168 and multiplier 170. The algebraic sum of the output of adder 160 on line 166 and $Z_m$ from storage 162 on line 164 is generated by adder 168 on line 172. The product of the output of adder 160 and $Z_m$ from multiplier 170 on line 174 is coupled as one input signal to adder 176. The other input to adder 176 is the signal representing the symmetrical polynomial $\sigma^2$ on line 60b from register 58. The output of adder 168 on line 172 is coupled as the denominator input to divider 178 while the output of adder 176 on line 180 is coupled as the numerator input to divider 178. The output of divider 178 on line 182 is also coupled as one input to adder 184 and as one input to adder 188. The other input to adder 184 is a predetermined tolerance signal on line 186. If the absolute magnitude of the change in $Z_m$, or $\Delta Z_m$, is less than the predetermined tolerance signal on line 186, the output signal of the adder 186 on line 190 is stored in storage unit 162.

In order to speed up the Newton's methods solution, the output signal of storage unit 162 on line 192 is also coupled as the other input to adder 188. Thus, the signal representing the old value of $Z_m$ on line 192 is compared in adder 188 with the change, $\Delta Z_m$, that is present on line 182 and the resulting algebraic addition is coupled on line 194 to storage 162. It is used to calculate the subsequent frequency component, $Z_m+1$. Because the change in the $Z_m$ output signal is small between calculations, the signal output of register 68 on line 74 can be coupled to storage unit 162 as an initial estimate for use in anticipating the calculation of the subsequent frequency component which speeds up the process. The final output signal on line 64 of the polynomial solver 62 is coupled to register 68 as indicated previously.

Thus, there has been disclosed an apparatus for performing an exact technique for parameterizing an input signal as a sum of N unrelated sine waves of various amplitudes, frequencies and phases. The technique uses a 2N-order difference equation to describe the sine wave sum and converts the problem to a solution of the roots of an N-order polynomial. The invention directly yields estimates of the amplitude, frequency and phase parameters for each frequency component assumed to be present at the same rate as the sampling rate with a constant time delay determined only by the assumed number of frequency components (N). The amount of hardware required depends only on N and does not depend upon the bandwidth of the input signal.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined in the appended claims.

I claim:

1. Apparatus for parameterizing a digital input signal which is the sum of N unrelated sine wave signals of various frequencies, $\omega_m$, amplitudes, $A_m$, and phases $B_m$ where $m = 1 \cdots N$, said apparatus comprising:

first data storage means for storing samples $Y_t \cdots Y_{t-(3N-1)h}$ of the digital input signal representing samples at time, t, from the most recent to the oldest sample where h = the time interval between samples, weighted adder means coupled to the first data storage means for receiving the stored samples and calculating a matrix of row and column component signals, $C_{nK}$, by adding selected ones of the stored samples, $Y_t \cdots Y_{t-(3N-1)h}$, with a weighting function according to the equation $$C_{nk} = (-2)^{-K+1} \sum_{l=0}^{K} \binom{K}{l} Y_{t-(n+2K-l-3)h}$$

where $n = 1 \cdots N$ rows, $K = 1 \cdots N+1$ columns, h = time interval between samples and l = a column between O and K, to obtain the matrix array of signals $$\begin{bmatrix} y_t - \frac{1}{2}(y_{t+h} + y_{t-h}) & \frac{1}{4}(y_{t+2h} + 2y_t + y_{t-2h}) \cdots \\ y_{t+h} - \frac{1}{2}(y_{t+2h} + y_t) & \frac{1}{4}(y_{t+3h} + 2y_{t+h} + y_{t-h}) \cdots \\ \cdot & \cdot \\ \cdot & \cdot \\ y_{t+(N-1)h} - \frac{1}{2}(y_{t+Nh} + y_{t+(N-2)h}) \cdots \end{bmatrix} \begin{bmatrix} \sigma^N \\ \sigma^{N-1} \\ \cdot \\ \cdot \\ \sigma^1 \end{bmatrix} =$$

$$\begin{bmatrix} \frac{(-)^{N+1}}{2^N}(y_{t+Nh} + Ny_{t+(N-2)h} + \cdots \\ \cdot \\ \cdot \\ \cdot \end{bmatrix}$$

a first matrix inverter coupled to the weighted adder means for receiving the $C_{nK}$ row and column signals and generating signals representing a set of symmetrical polynomials, $\{\sigma^m\}$, according to the equation $$\sigma^{(N+1-n)} = (-)^{n+1} \sum_{K=1}^{N} (C^{-1})_{nK} (C_{K,N+1})$$

, with each polynomial having coefficients, $Z_m$, representing the cosines of the N frequency components of the input signal, a polynomial solver coupled to the first matrix inverter for receiving the signals representing the set of symmetrical polynomials, $\{\sigma^m\}$, and calculating the roots of each polynomial according to the equation $$0 = \sum_{K=0}^{N} (-)^K \sigma^{(K)} Z^{N-K}$$

to obtain signals representing the cosine frequency components, $Z_m$, where $Z_m = \cosine \omega_m h$ and M = the input signal frequency component between 1 and N, and a function inverter coupled to the polynomial solver for calculating the frequency, $\omega_m$, of each of the N unknown input sine waves for each of the digital signal samples according to the equation $$\omega_m = \frac{1}{h} a\cos Z_m.$$

2. Apparatus as in claim 1 further comprising:
second data storage means coupled between the polynomial solver and the function inverter for storing the cosine of the frequency components, $Z_m$ and
circuit means coupling the cosine of the frequency components, $Z_m$, back to the polynomial solver for use in anticipating the calculation of the subsequent frequency component, $Z_m+1$.

3. Apparatus as in claim 1 further comprising:
first calculator means coupled to the function inverter for receiving the calculated frequencies $\omega_m = 1/h a\cos Z_m$ and generating the functions $\sin(k\omega_m h)$ and $\cos(k\omega_m h)$;
second storage means coupled to the first calculator means for storing the functions $\sin(k\omega_m h)$ and $\cos(k\omega_m h)$ and solving the equation $$y_{t-Kh} = \sum_{m=1 \ldots N}^{N} \{A_m \cos k\omega_m h + B_m \sin k\omega_m h\},$$

a second matrix inverter for receiving the stored sine ($k\omega_m h$), cosine ($k\omega_m h$) signal functions and the stored digital input samples $Y_t \cdots Y_{t+(3N-1)h}$ and calculating the respective signal amplitude coefficients $A_1 \cdots A_n$ and signal phase coefficients $B_1 \cdots B_n$; and second calculator means coupled to receive the signal amplitude coefficients and the signal phase coefficients from the second matrix inverter for calculating the signal amplitude $$\sqrt{A_m^2 + B_m^2}$$

and signal phase $B_m = \arctan 2(B_m, A_m)$.

4. Apparatus as in claim 3 wherein the second matrix inverter solves the simultaneous equations $$\begin{bmatrix} y_t \\ y_{t+h} \\ \cdot \\ \cdot \\ \cdot \\ y_{t+(N-1)h} \\ y_{t+2Nh} \\ \cdot \\ \cdot \\ y_{t+(3N-2)h} \\ y_{t+(3N-1)h} \end{bmatrix} =$$

$$\begin{bmatrix} \cos \omega_1 t \sin \omega_1 t \cos \omega_2 t \sin \omega_2 t \ldots \sin \omega_N t \\ \cos \omega_1(t+h) \sin \omega_1(t+h) \ldots \\ \cos \omega_1(t+[N-1]h) \ldots \\ \cdot \\ \cdot \\ \cdot \end{bmatrix} \begin{bmatrix} A_1 \\ B_1 \\ \cdot \\ \cdot \\ \cdot \\ A_N \\ B_N \end{bmatrix}$$

to obtain the signal amplitude coefficients $A_1 \cdots A_N$ and the signal phase coefficients $B_1 \cdots B_N$ from which the signal amplitude, $A_m$, and phase, $B_m$, can be calculated.

5. Apparatus as in claim 1 wherein said first matrix inverter generates signals representing symmetrical polynomials of the form
$$g(x) = X^N - \sigma^1(z)X^{N-1} + \sigma^2(z)X^{N-2} \cdots + (-)^N \sigma^N$$
from the matrix formed by the weighted adder means.

6. A device for parameterizing an input signal, $Y_t$, as a sum of N unrelated sine waves of various amplitudes, $A_m$, frequencies, $\omega_m$, and phases, $B_m$ where $m = 1 \cdots N$, said device comprising:

storage means for digitally sampling the input signal, $Y_t$, at successive times, t, with constant time intervals, h, matrix inverter means coupled to the storage means for converting the digital samples of the sine wave sum signals to an N-order polynomial, and calculator means coupled to the matrix inverter means for solving the roots of the N-order polynomial to enable the determination of the frequency, amplitude and phase of the N unrelated sine wave signals.

* * * * *